United States Patent [19]
Bole

[11] 3,791,193
[45] Feb. 12, 1974

[54] LENS FRANGIBILITY TESTING APPARATUS

[75] Inventor: Hamilton B. Bole, Sturbridge, Miss.

[73] Assignee: American Optical Corporation, Southbridge, Mass.

[22] Filed: July 19, 1972

[21] Appl. No.: 273,239

[52] U.S. Cl. ................................. 73/12, 73/87
[51] Int. Cl. ............................................ G01n 3/62
[58] Field of Search ......................... 73/12, 79, 87

[56] References Cited
UNITED STATES PATENTS

| | | | |
|---|---|---|---|
| 2,648,975 | 8/1953 | Eves | 73/12 |
| 2,699,672 | 1/1955 | Couch et al. | 73/12 |
| 2,729,094 | 1/1956 | Piety | 73/12 X |
| 2,214,412 | 12/1941 | Shindel | 73/87 X |
| 2,281,324 | 4/1942 | Preston | 73/12 |
| 2,579,503 | 12/1951 | Lubin et al. | 73/12 |

Primary Examiner—Charles A. Ruehl
Attorney, Agent, or Firm—William C. Nealon; Bernard L. Sweeney

[57] ABSTRACT

Ball dropping apparatus for testing the frangibility of lenses including a base having an elongated hollow tower extending vertically therefrom with lens supporting means in the tower adjacent the base and a receptacle for receiving and guiding a steel ball to a drop point adjacent the uppermost end of the tower. A motor driven ball elevator screw extends along one side of the tower from a point adjacent the lens supporting means to the receptacle adjacent the uppermost end of the tower. An electrically operated gate releases one test ball at a time from the drop point for impact upon a lens placed upon the supporting means and each dropped ball is guided to the elevator screw for return to the upper receptacle and reuse.

5 Claims, 6 Drawing Figures

3,791,193

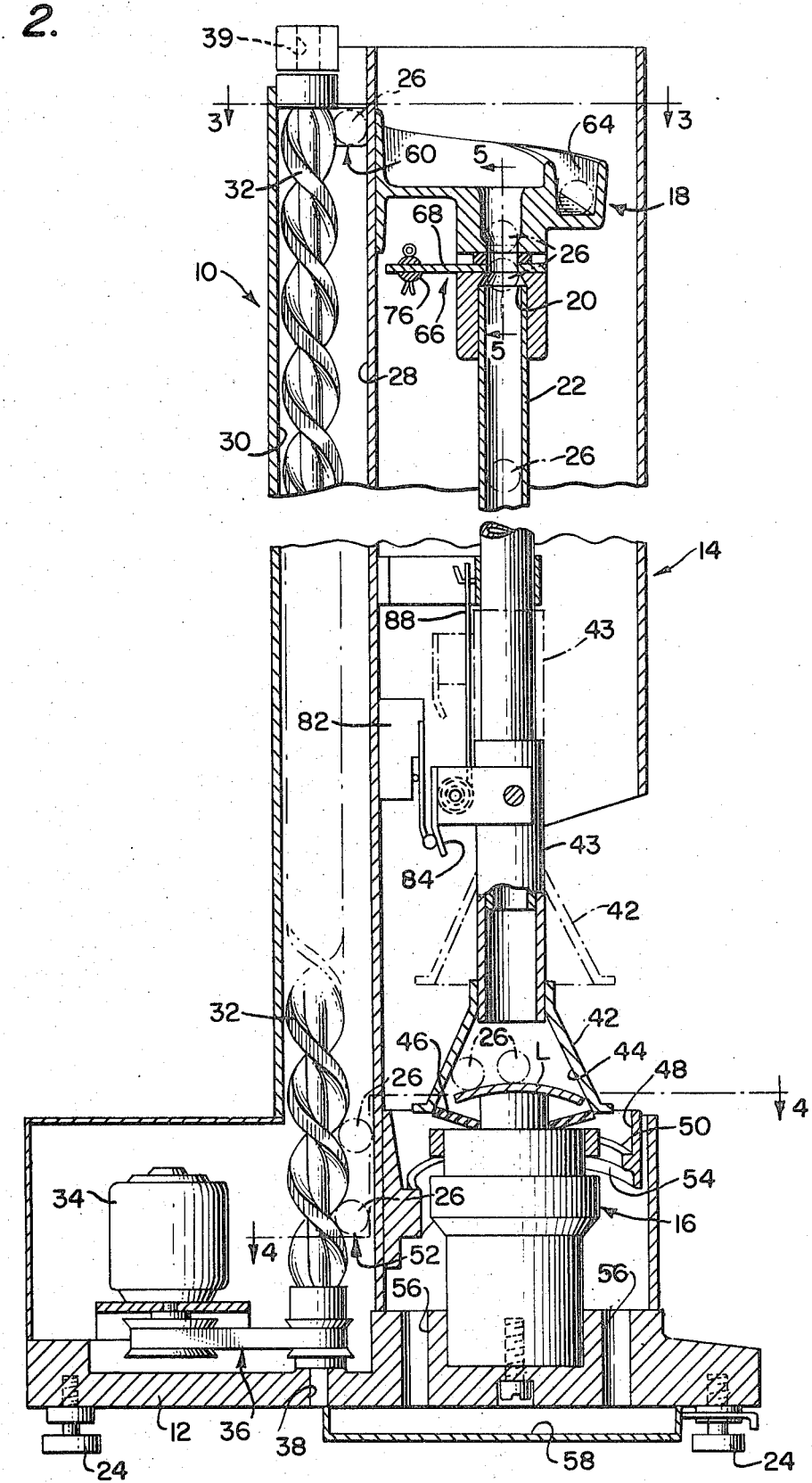

LENS FRANGIBILITY TESTING APPARATUS

BACKGROUND OF THE INVENTION

1. Field of the Invention

Lens frangibility testing apparatus with particular reference to an automatically operated drop ball lens tester.

2. Description of the Prior Art

A minimal requirement for lens drop ball testing is that a 5/8 inch steel ball be dropped a distance of 50 inches upon the surface of a lens under test and that the lens withstand this impact without fracture or other damage. This requirement for a 50 inch ball drop, which usually takes place in a tower-like structure, locates the drop point far from easy reach from an operator when the tower apparatus is placed upon a work bench or table top. Thus, manual positioning of balls in receptacles at or higher than 50 inches above a table top usually requires the climbing of step ladders or the like. This results in undue operator fatigue and increases chances of injury from tripping and falling especially during prolonged testing operations. The alternative of locating the test apparatus upon the floor requires a similarly fatiguing downwardly bending motion with each test operation to remove and replace tested lenses and retrieve test balls. In either case, and particularly in prolonged testing operations, operator fatigue along with its undesirable consequences of inefficient performance, relatively high operational cost and possible injury liability have, heretofore, been the rule.

This invention overcomes undue operator fatigue and its consequences in drop ball testing operations by obviating all requirements for climbing or bending.

SUMMARY OF THE INVENTION

The present drop ball testing apparatus having the usual base and hollow tower extending vertically therefrom with lens supporting means in the tower adjacent the base further has a ball catcher surrounding the lens support which is arranged with a downwardly inclined track for gravity feeding used balls to an elevator pick-up point. A continuously rotating elevator screw encased within a tubular housing receives and raises the used balls to a point adjacent the top of the tower whereupon they are released into a collection receptacle. With gravity feed from the receptacle, one ball at a time is automatically dispensed into a solenoid operated ball dropping mechanism. With the opening of a gate in this mechanism by electrical switch operation, one ball at a time is released from a drop point at least 50 inches above the surface of a lens placed therebelow upon the lens supporting means. A guide tube extending vertically from the drop point to within a few inches of the lens supporting means guides the ball to an accurately centered point of impact relative to the axis of the lens supporting means. Continuous automatic retrieval and elevating of all dropped balls to the drop point minimizes operator participation to simple insertion and removal of lenses before and after testing from a fixed standing or sitting position.

Details of this invention will become more readily apparent from the following description when taken in conjunction with the accompanying drawings.

IN THE DRAWINGS

FIG. 2 is an enlarged fragmentary cross-sectional view of the drop ball lens tester taken generally along line 2—2 of FIG. 1;

DESCRIPTION OF THE PREFERRED EMBODIMENTS

Figure 3:
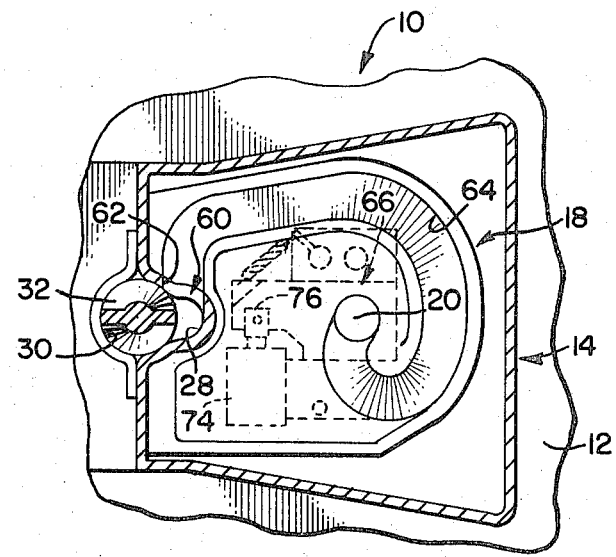
FIG. 3 is a cross-sectional view taken along line 3—3 of FIG. 2.
Figure 4:
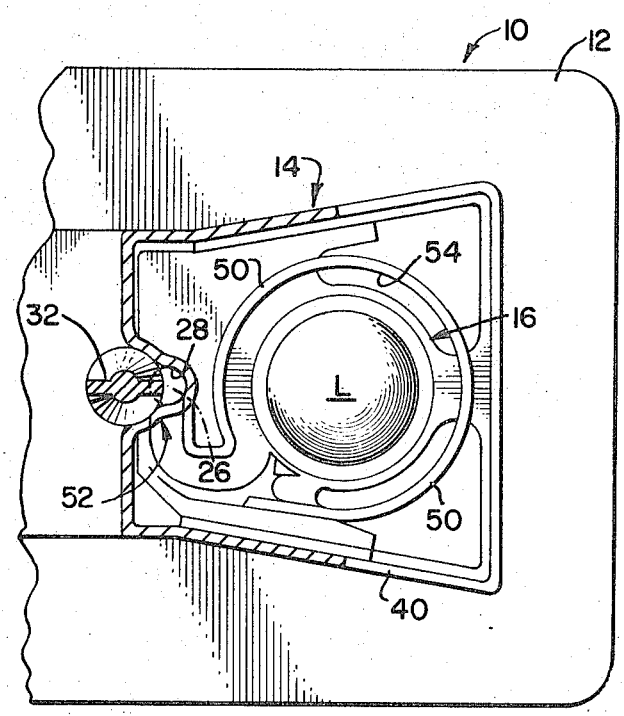
FIG. 4 is another cross-sectional view taken along line 4—4 of FIG. 2.

Lens tester 10 comprises base 12 having hollow tower 14 extending vertically therefrom. A lens support 16 (FIGS. 2 and 4) is located within tower 14 adjacent base 12 and a ball receptacle 18 (FIGS. 2 and 3) is located adjacent the uppermost end of tower 14 for receiving and guiding test balls to a drop point 20 above lens support 16. A guide tube 22 extends from drop point 20 to within a few inches of lens support 16. Tube 22 guides each ball dropped from point 20 to a point of impact upon lens L which is accurately centered relative to the axis of lens supporting means 16.

Leveling screws 24 in base 12 are provided for use in orienting tower 14 and guide tube 22 so that the test balls 26 shown in dot-dash outline fall freely downwardly through tube 22 when released from drop point 20. Only one ball 26 is used in each lens testing operation, but for purposes of illustration several broken line drawings of a ball 26 are shown in FIG. 2 to depict various successive positions assumed by the ball in the course of a lens testing operation.

Tower 14 is preferably a hollow metallic, e.g. aluminum, extrusion having a ball lift channel 28 extending from bottom to top thereof. A second juxtaposed channel 30 opening into channel 28 contains elevating screw 32 which is operated by motor 34 through a belt and pulley drive mechanism 36. Screw 32 is continuously rotated about its axis in journalings 38 and 39.

Figure 1:
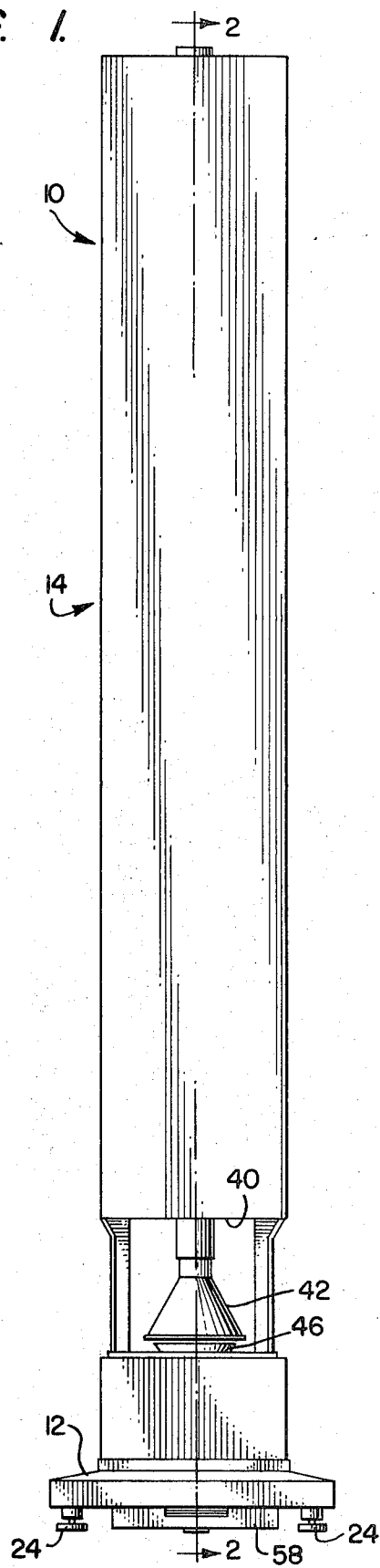
FIG. 1 is a front elevational view of a preferred embodiment of the invention.

Loading and unloading lenses L to be tested is accomplished through a large frontal opening 40 (FIGS. 1 and 2). For protection against flying glass fragments resulting from lens breakage upon failure of a lens to survive the drop ball test, cone 42 is provided. It is arranged to slide upwardly and downwardly along tube 22, guided by cylindrical shank 43.

With cone 42 in its uppermost position as shown by dot-dash outline in FIG. 2, access is provided to lens support 16 for the positioning and removal of lenses respectively prior to and following drop ball testing. During testing, cone 42 is placed at its lowermost position shown by full line drawing in FIG. 2 to form a testing chamber 44 having closed sidewalls. Chamber 44 is further closed beneath lens L by diaphragm 46 of rubber or similarly flexible material. Diaphragm 46 cushions the fall of a test ball after bouncing from lens L thereby facilitating retrieval of the ball in collector 48 without undue bouncing or chance of escape through opening 40 in tower 14. Collector 48 is provided with a downwardly spiraling track 50 (FIGS. 2 and 4) along which used balls 26 are guided to a pick-up station 52 adjacent the base of tower 14. Openings 54 and 56 in collector 48 and base 12 respectively allow broken pieces and chips of glass from fractured lenses L to fall downwardly into a collecting tray 58 (FIG. 2) for convenience of collection and subsequent disposal.

Figure 5:
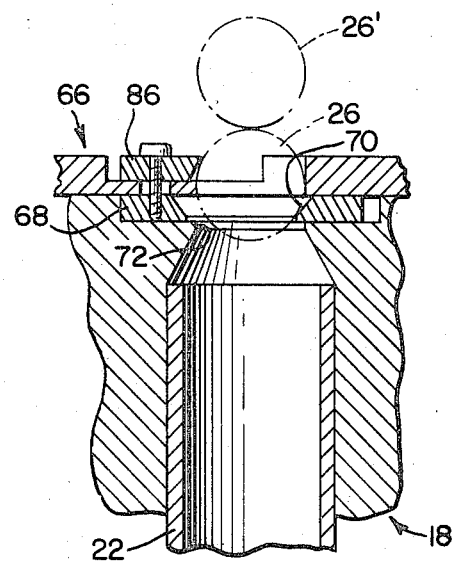
FIG. 5 is a greatly enlarged fragmentary cross-sectional view of a portion of the ball release mechanism taken along line 5—5 of FIG. 2.
Figure 6:
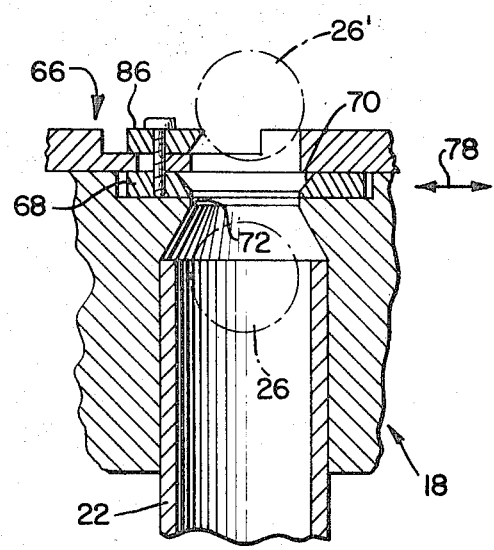
FIG. 6 is a view similar to FIG. 5 illustrating the ball releasing operation of the mechanism.

The location of pick-up station 52 within channel 28 (FIG. 4) causes each ball 26 entering thereinto to engage the root of screw 32 and become automatically carried upwardly through channel 28 by rotation of the screw to an unloading station 60 at receptacle 18. At station 60, the ball discharges through opening 62 into a serpentine collecting guideway 64 which leads to drop point 20. Adjacent drop point 20, gating mechanism 66 releases the collected balls one at a time under the control of an operator as follows:

Referring more particularly to FIGS. 5 and 6, it can be seen that gating mechanism 66 comprises lower plate 68 having opening 70 through which a test ball 26 may be freely dropped. Plate 68 is arranged to selectively slide back and forth laterally across opening 72 in receptacle 18. Solenoid 74 (FIG. 3) which is coupled to plate 68 with connection 76 functions to slide plate 68 back and forth in the direction indicated by arrow 78. In its normal position of rest, plate 68 is located by biasing spring 80 (FIG. 3) with its opening 70 slightly off-center relative to opening 72. Thus, ball 26 is prevented from dropping through opening 72. When, however, cone 42 of mechanism 10 is lowered to the position shown by full line drawing in FIG. 2, microswitch 82 is closed by trip lever 84. This energizes solenoid 74 causing plate 70 to move into alignment with opening 72 as shown in FIG. 6 allowing ball 26 to drop into tube 22 for a test operation.

In order to assure the dropping of only one ball 26 with each lowering of cone 42, a second plate 86 is fixed to plate 68 and slides therewith. This second plate 86, in moving with plate 68 when solenoid 74 is energized, catches the next succeeding ball 26 in guideway 64 as shown in FIG. 6. This second ball 26' is held as shown in FIG. 6 until cone 42 is returned to its uppermost position (FIG. 2) and solenoid 74 is de-energized. Plate 68 is then returned to its normal position of rest as shown in FIG. 5 and ball 26' drops into plate against plate 70 in readiness for a repeat of the operation of ball dropping by the lowering of cone 42 as described hereinabove.

It is pointed out that the placement and replacement of lenses upon support 16 and lowering of cone 42 to initiate the testing operation is the only participation required of an operator in the performance of the test with apparatus 10. A negator spring 88 automatically returns cone 42 to its uppermost position upon release thereof after lowering for a test operation.

With motor 34 continuously operating to rotate elevating screw 32 and a supply of balls 26 in the system, apparatus 10 is in readiness for use. The performance of a testing operation takes place as follows:

A lens L is placed upon lens support 16 and cone 42 is lowered manually to the position shown by full line drawing in FIG. 2. At this point, trip lever 84 contacts microswitch 66 and immediately releases one ball 26 for a fall from drop point 20 onto lens L. This dropping of ball 26 which takes place almost instantaneously with the lowering of cone 42 completes the test before movement of the cone upwardly by negator spring 88 can take place irrespectively of the suddenness of release of cone 42 by an operator. Thus, the danger of operator injury from flying glass particles caused by lens breakage or egress of a dropped ball is obviated. The automatic return of cone 42 to its uppermost position places apparatus 10 in readiness for a succeeding test operation.

The apparatus is supplied with a number of test balls 26 no greater than an amount which can be completely contained, at one time, in collecting guideway 64, of receptacle 18. Enough balls 26 are normally supplied, however, to maintain at least one in readiness for dropping at all times so that the period of time required for test dropping, retrieval and return of a particular test ball to dropping point 20 is considerably less than the minimum time required for releasing the full compliment of test balls from collecting guideway 64 of receptacle 18.

An electrical circuit (not shown) for the operation of solenoid 74 may comprise a series connected relationship of microswitch 86 and solenoid 74 with a suitable source of electrical current. Likewise, the operation of motor 34 may comprise simply an electrically series connected relationship of motor 34 with the same or another suitable source of electrical current.

I claim:

1. Drop ball apparatus for testing the frangibility of a lens comprising:

a base;

an elongated hollow tower extending vertically from said base;

means for supporting a lens to be tested within said tower adjacent said base;

a ball receptacle adapted to receive and guide test balls to a drop point within said tower adjacent its uppermost end;

means for selectively dropping one of a succession of balls at a time from said drop point toward said lens supporting means, said selectively dropping means including a pair of spaced interconnected simultaneously movable plate members, a lowermost of said plate members having a first opening therethrough and being movable across a second opening in said ball receptacle, said first and second openings being individually adapted to freely receive each of said balls of said succession for dropping therethrough at said drop point, said movement of said lowermost plate being restricted to a position of axial mis-alignment for withholding said dropping of said first ball through both of said first and second openings and selectively to another position of axial alignment for permitting the dropping of said first ball through said first and second openings, and the other of said plates being arranged to engage a second of said succession of balls for preventing said second ball from unwantingly becoming dropped through said first and second openings until a condition of axial alignment of said first and second openings is repeated;

ball retrieving means surrounding said lens supporting means; and a rotatable elevating screw extending along one side of said tower from said ball retrieving means upwardly to a point adjacent said ball receptacle for receiving balls from said retrieving means and automatically returning same to said receptacle.

2. Drop ball apparatus according to claim 1 wherein said rotatable elevating screw is motor driven and contained within a channel at said one side of said tower and said side of said tower contains a second juxtapositioned ball elevating channel into which the root of said screw extends for receiving said balls from said retrieving means for elevating same in said second channel by rotation of said screw.

3. Drop ball apparatus for testing the frangibility of a lens comprising:
a base;
an elongated hollow tower extending vertically from said base;
means for supporting a lens to be tested within said tower adjacent said base;
a ball receptacle adapted to receive and guide test balls to a drop point within said tower adjacent its uppermost end;
means for selectively dropping one of a succession of balls at a time from said drop point toward said lens supporting means;
tubular means for guiding test balls from said drop point to a point adjacent said lens supporting means;
shielding means movable along said tubular means toward and away from said lens supporting means for selectively enclosing lenses supported thereon during said dropping of said balls and for exposing said lenses after said ball dropping;
ball retrieving means surrounding said lens supporting means; and
a rotatable elevating screw extending along one side of said tower from said ball retrieving means upwardly to a point adjacent said ball receptacle for receiving balls from said retrieving means and automatically returning same to said receptacle.

4. Drop ball apparatus according to claim 3 wherein said shielding means is electromechanically coupled to said means for selectively dropping said balls wherewith the dropping of one of a succession of balls is automatically initiated by the moving of said shielding means toward said lens supporting means.

5. Drop ball apparatus according to claim 4 further including spring return means for normally urging said shielding means in a direction away from said lens supporting means.

* * * * *